United States Patent [19]

Magliano

[11] Patent Number: 4,706,791
[45] Date of Patent: Nov. 17, 1987

[54] IRREVERSIBLE FREE WHEELING CLUTCH
[75] Inventor: Silvio Magliano, Turin, Italy
[73] Assignee: American Standard Inc., Pittsburgh, Pa.
[21] Appl. No.: 919,414
[22] Filed: Oct. 16, 1986

Related U.S. Application Data

[63] Continuation of Ser. No. 682,201, Dec. 17, 1984, abandoned.
[51] Int. Cl.$^4$ .............. F16D 15/00; F16D 59/00; F16D 67/00
[52] U.S. Cl. .............................. 192/8 R; 192/7
[58] Field of Search ............................ 192/7, 8 R

[56] References Cited

U.S. PATENT DOCUMENTS

| 1,015,861 | 1/1912 | Warner | 192/8 R |
| 2,260,119 | 10/1941 | Marshall | 192/8 R |
| 2,557,784 | 6/1951 | D'Arcey | 192/8 R |
| 3,110,381 | 11/1963 | Leu | 192/8 R |
| 3,119,479 | 1/1964 | Lund | 192/8 R |
| 3,243,023 | 3/1966 | Boyden | 192/8 R |
| 3,695,402 | 10/1972 | Klemm | 192/8 R |
| 3,835,967 | 9/1974 | Kerr | 192/8 R |
| 4,253,554 | 3/1981 | Nisenson | 192/8 R |

FOREIGN PATENT DOCUMENTS

| 870422 | 5/1971 | Canada | 192/8 R |
| 2031527 | 12/1971 | Fed. Rep. of Germany | 192/8 R |

Primary Examiner—Rodney H. Bonck
Assistant Examiner—David A. Testardi
Attorney, Agent, or Firm—J. B. Sotak

[57] ABSTRACT

An irreversible free wheeling clutch arrangement having a hollow housing member for rotatably supporting an input driveshaft and an output driven shaft. A one-way transmission mechanism is provided including a plurality of roller bearings caged between a plurality of arcuate segments formed on the input shaft and cooperatively associated with a multi-faced contact member carried by the output shaft so that rotary movement of the input shaft is transferred to the output shaft but attempted rotary movement of the output shaft is not transferred to the input shaft.

6 Claims, 2 Drawing Figures

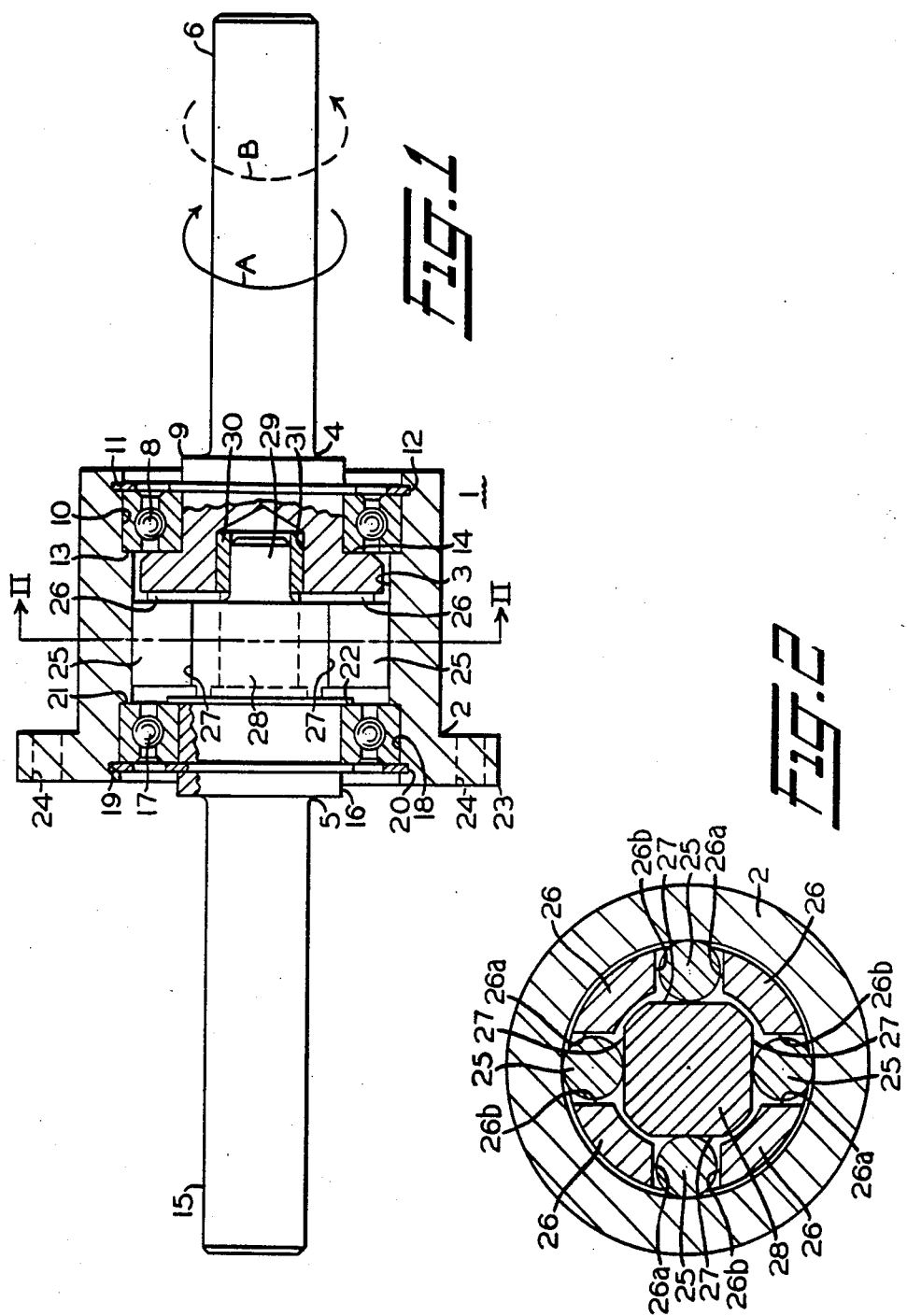

4,706,791

IRREVERSIBLE FREE WHEELING CLUTCH

This is a continuation of co-pending application Ser. No. 682,201 filed on Dec. 17, 1984, now abandoned.

FIELD OF THE INVENTION

This invention relates to an irreversible free wheeling coupling mechanism and, more particularly, to a nonreversible clutch having a hollow cylindrical housing member for rotatably supporting an input and an output shaft which are interconnected by a plurality of roller bearings caged between axially extending outer arcuate portions carried by the input shaft and an inner block member carried by the output shaft to permit rotational movement to be transmitted from the input shaft to the output shaft and to prevent rotational movement to be transmitted from the output shaft to the input shaft.

BACKGROUND OF THE INVENTION

It is well known that free wheeling clutches are utilized in many industrial applications in which it is necessary to preclude reverse motion from the output to the input. For example, in electromechanical switch machines in railroad interlocking, it is essential to maintain the switch points in the position to which they have been moved and to prevent vibrations from inadvertently opening the switch points. Thus, it is advantageous to couple the electric motor of the switch machine to the switch points through a unidirectional clutch which permits the switch points to be driven between their extreme positions by the electric motor but which prevents reverse motion from the switch points to the electric motor. Accordingly, the switch points are positively locked in their normal or reverse positions by the unidirectional clutch which eliminates the need of ancillary devices, such as, lock rods, plungers, etc., which were required in previous railroad switch installations. It is obvious that the unidirectional coupler may be used in any installation in which it is necessary to transmit bidirectional rotary movement from an input shaft to an output shaft and in which it is mandatory to ensure that no rotary movement will be conveyed from the output shaft to the input shaft. While previous one-way spring-type clutches have been proposed, it is advantageous to avoid the use of springs since they are susceptible to fatigue which results in failure of the clutch operation.

OBJECTS AND SUMMARY OF THE INVENTION

Accordingly, it is an object of this invention to provide a new and improved irreversible rotary clutch mechanism.

Another object of this invention is to provide a unique, nonreversible, free wheeling coupling device which only transfers rotary motion from an input shaft to an output shaft.

A further object of this invention is to provide a novel, nonreversible clutch including a one-way transmission mechanism which interconnects an input driving shaft to an output driven shaft.

Yet another object of this invention is to provide an improved, nonreversible, free wheeling clutch having an input and an output shaft which are coupled together by a plurality of roller bearings caged between axially extending arcuate segments carried by the input shaft and an inner block member carried by the output shaft to only permit rotational movement to be transmitted from the input shaft to the output shaft.

Yet a further object of this invention is to provide an irreversible clutch comprising, a hollow cylindrical housing having an axial bore for receiving a rotatable input shaft and a rotatable output shaft, a nonreversible transmission mechanism interconnecting the input shaft to the output shaft, the nonreversible transmission mechanism including a plurality of arcuate segments carried by the input shaft and a block member having a plurality of contact surfaces carried by the output shaft, and a plurality of roller bearings caged between the plurality of arcuate segments and cooperatively associated with the plurality of contact surfaces and the axial bore to allow rotary movement to be transferred from the input shaft to the output shaft and to prevent rotary movement from being transferred from the output shaft to the input shaft.

Still another object of this invention is to provide a unique and improved irreversible free wheeling clutch which is simple in design, economical in construction, reliable in operation, efficient in service and durable in use.

BRIEF DESCRIPTION OF THE DRAWINGS

The above objects and other attendant features and advantages of the invention will become more readily evident from the following detailed description when considered in conjunction with the accompanying drawings in which:

FIG. 1 is a longitudinal view, partly in section, of an irreversible rotary free wheeling clutch according to the present invention.

FIG. 2 is a cross-sectional view taken substantially along line II—II of FIG. 1.

DETAILED DESCRIPTION OF THE INVENTION

Referring now to the drawing, and in particular to FIG. 1, there is shown an irreversible rotary clutch or unidirectional free wheeling coupling device which is generally characterized by numeral 1. As shown, the unidirectional clutch 1 includes a hollow cylindrical housing or casing member 2 having an axial bore 3 for receiving the nonreversible one-way transmission mechanism which interconnects an input driving shaft 4 and an output driven shaft 5. The input shaft 4 includes an external reduced portion 6 which is suitably coupled to the driveshaft of a prime mover, such as, an electric motor or the like. The shaft 4 is rotatably supported on a ball bearing 8. The inner race of bearing 8 is carried by an intermediate enlarged portion 9 of driveshaft 4 while the outer race of bearing 8 is seated in an annular undercut 10 formed in the right end of axial bore 3 of housing 2 as shown in FIG. 1. A split retaining ring 11 is inserted into an internal annular groove 12 formed in the axial bore 3 to hold the bearing 8 in place against shoulder portions 13 and 14 formed in bore 3 and on shaft 4, respectively.

It will be seen that the driven output shaft 5 includes an external reduced portion 15 which may be suitably connected through appropriate coupling means to the switch points of the track switch for movement between normal and reverse positions as is well known. The output shaft 5 includes an intermediate enlarged portion 16 which cooperates with the inner race of a ball bearing 17. The outer race of bearing 17 is fitted into an annular undercut 18 formed in the left end of axial bore 3, as shown in FIG. 1. A split retaining ring 19 is inserted into an internal annular groove 20 formed in the axial bore 3 to hold the bearing 17 in place against shoulder portion 21 formed in the axial bore 3 and against collar portion 22 which is part of the shaft 5. As shown, the left end of housing 2 is provided with a flange 23 which includes a plurality of mounting holes or apertures 24 for internally securing the free wheeling clutch 1 in the casing of the railroad switch mechanism.

Referring now to FIGS. 1 and 2, it will be seen that the unidirectional rotary transfer mechanism includes a plurality of cylinder roller bearings 25 which are caged between a plurality of axial extending outer arcuate portions or segments 26 and which are captured between the multicontact surfaces 27 of inner block member 28 and the axial bore 3. The four arcuate segments 26 are an integral part of the enlarged portion of the input shaft 4 while the four-sided square member 28 is an integral part of the output shaft 5. In viewing FIG. 1, it will be noted that the inner extremity of shaft 5 is provided with a stem portion 29 which cooperates with a journal bearing 30 which is press-fitted into bore hole 31 formed in the inner enlarged portion of shaft 4. The stem 29 and journal 30 not only stabilize the two shafts but also assist in the alignment of the entire assembly.

In describing the operation of the irreversible free wheeling clutch, it will be assumed that the parts are assembled and are in the positions shown in FIGS. 1 and 2 and that a rotational movement is imparted to the input shaft 4 by energization of the electric drive motor. Further, let us assume that the rotation is in a clockwise direction as illustrated by solid-line arrow A. The clockwise rotation imparted to shaft 4 causes the arcuate sections 26 to also revolve in a clockwise manner. Thus, in viewing FIG. 2, it will be seen that the leading edges 26a of the revolving segments 26 will contact the peripheral surfaces of rollers 25 to cause them to spin freely about their respective axis. Accordingly, the free spinning rollers 25 impart a clockwise rotation to the output shaft 5 through contact surfaces 27 of the block portion 28. Now let us assume that the rotation of the electric motor is reversed so that the input shaft 4 is rotated in a counterclockwise direction, as shown by the dash-line arrow B. Under this condition, the leading edges 26b of arcuate extensions 26 contact the peripheral surfaces of rollers 25 to cause the rollers 25 to freely spin about the axial bore 3 thereby driving the output shaft 5 in a counterclockwise direction. That is, the spinning roller bearings 25 work on the contact surfaces 27 of the block member 28 to cause the turning of the output shaft in a counterclockwise direction. Thus, any rotational movement imparted to the input shaft 4 is conveyed to the output shaft 5 via the transmission mechanism.

Let us now assume that the electric drive motor is deenergized so that the input shaft 4 is idled and that vibrations or other extraneous forces ply to open the switch points. Under such a condition, a turning force or moment is imparted to the output shaft 5. Thus, the rotational motion imparted to shaft 5 causes the block portion 28 to rotate wherein the contact surfaces 27 urge the roller bearing radially outwardly against the axial bore 3 to tightly lock the shaft 5 against any further rotational displacement. Accordingly, any attempt to impart clockwise or counterclockwise rotation to shaft 5 results in the locking or jamming of the roller bearings 25 between the contact surfaces 27 and the cylindrical bore 3 of the casing 2. Hence, the unidirectional clutch 1 is only capable of conveying rotational movement from the input shaft 4 to the output shaft 5 and is incapable of transmitting angular motion from the output shaft to the input shaft.

It will be appreciated that the present invention finds particular utility in railroad switch machines, but it is readily understood that the presently described irreversible, free wheeling clutch may be employed in other fields which require the nonreversible conveyance of rotary motion between input and output shafts. Further, it is understood that regardless of the manner in which the invention is employed, it is apparent that various changes and modifications may be made by persons skilled in the art without departing from the spirit and scope of this invention. For example, it is understood that the quadruple arrangement may be varied and the number of roller bearings 25, arcuate segments 26, and contact surfaces 27 may be increased or decreased depending upon the size and torque characteristic requirements demanded of the clutch. Thus, it will be appreciated that all variations, alterations, and equivalents falling within the bounds of the present invention are herein meant to be included in the appended claims.

Having thus described the invention, what I claim as new and desire to secure by Letters Patent, is:

1. An irreversible clutch comprising, a hollow cylindrical housing having an axial bore for receiving a rotatable input shaft rotatably supported in said hollow cylindrical housing by a first ball bearing, said first ball bearing includes an inner race which is carried by an intermediate enlarged portion of said input shaft and which is seated against a shoulder portion formed on said intermediate enlarged portion of said input shaft, said first ball bearing includes an outer race which is seated against a shoulder portion in an annular undercut located in one end of said axial bore of said hollow cylindrical housing, a first split ring inserted into an internal annular groove formed in said axial bore for holding said first ball bearing in place, a rotatable output shaft including a stem portion which is journaled in a journal bearing which is located in said input shaft, said output shaft is rotatably supported in said hollow cylindrical housing by a second ball bearing, said second ball bearing includes an inner race which is carried by an intermediate enlarged portion of said output shaft and which is seated against a collar portion formed on said intermediate enlarged portion of said output shaft, said second ball bearing includes an outer race which is seated against a shoulder portion formed in an annular undercut located in the other end of said axial bore of said hollow cylindrical housing, a second split ring inserted into an internal annular groove formed in said axial bore for holding said second ball bearing in place, a nonreversible transmission mechanism interconnecting said input shaft to said output shaft, said nonreversible transmission mechanism including a plurality of arcuate segments carried by and integral with said input shaft and a block member having a plurality of contact surfaces carried by and integral with said output shaft, and a plurality of roller bearings caged between said plurality of arcuate segments and cooperatively associated with said plurality of contact surfaces and said axial bore to allow rotary movement to be transferred from said input shaft to said output shaft by causing said plurality of arcuate segments to spin said plurality of roller bearings to work on said plurality of contact surfaces and to prevent rotary movement from being transferred from said output shaft to said input shaft by causing said plurality of contact surfaces to lock said plurality of roller bearings against said axial bore.

2. The irreversible clutch, as defined in claim 1, wherein each of said arcuate segments of said input shaft includes leading edges which contact and spin said roller bearings to drive said block member of said output shaft.

3. The irreversible clutch, as defined in claim 1, wherein said block member includes four contact surfaces, each of which is cooperatively associated with one of said plurality of roller bearings.

4. The irreversible clutch, as defined in claim 1, wherein said plurality of arcuate segments extend axially along the longitudinal axis of said input shaft.

5. The irreversible clutch, as defined in claim 1, wherein said hollow cylindrical housing includes an apertured mounting flange.

6. The irreversible clutch, as defined in claim 1, wherein said plurality of arcuate segments are radially outwardly disposed with respect to said plurality of contact surfaces of said block member.

* * * * *